(12) United States Patent　　(10) Patent No.: US 12,534,125 B2
Frank et al.　　(45) Date of Patent: Jan. 27, 2026

(54) VEHICLE STEERING SYSTEM DIAGNOSTICS TOOL

(71) Applicant: Steering Solutions IP Holding Corporation, Saginaw, MI (US)

(72) Inventors: Andrew J. Frank, Rochester Hills, MI (US); Peter D. Schmitt, Farmington Hills, MI (US); SayedMohammad Hosseini, Royal Oak, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 219 days.

(21) Appl. No.: 18/208,519

(22) Filed: Jun. 12, 2023

(65) Prior Publication Data

US 2024/0409154 A1　Dec. 12, 2024

(51) Int. Cl.
　　*B62D 5/04*　　(2006.01)

(52) U.S. Cl.
　　CPC .......... *B62D 5/049* (2013.01); *B62D 5/0493* (2013.01)

(58) Field of Classification Search
　　CPC .... B62D 5/0481; B62D 5/0484; B62D 5/006; B62D 5/005; B62D 15/021; B62D 5/0457; B62D 5/0487
　　See application file for complete search history.

(56) References Cited

U.S. PATENT DOCUMENTS

| | | | |
|---|---|---|---|
| 10,768,075 B2 * | 9/2020 | Yu ........................... | G01L 5/221 |
| 10,946,894 B2 * | 3/2021 | Pramod ................ | B62D 5/0487 |
| 2002/0019690 A1 * | 2/2002 | Kurishige .............. | B62D 6/008 |
| | | | 180/443 |
| 2018/0346016 A1 * | 12/2018 | Otto ....................... | G07C 5/0808 |
| 2019/0047616 A1 * | 2/2019 | Lesbirel ............... | B62D 15/029 |
| 2019/0111968 A1 * | 4/2019 | Skellenger ............ | B62D 6/008 |
| 2019/0111969 A1 * | 4/2019 | Pramod ................. | B62D 5/005 |
| 2019/0308659 A1 * | 10/2019 | Pramod ................. | B62D 6/002 |
| 2019/0383707 A1 * | 12/2019 | Yu .......................... | G01L 5/221 |
| 2021/0380102 A1 * | 12/2021 | Kim ...................... | B60W 10/20 |

(Continued)

FOREIGN PATENT DOCUMENTS

| | | | | |
|---|---|---|---|---|
| CN | 108639146 A | | 10/2018 | |
| CN | 109334757 A | * | 2/2019 | ............... B62D 5/04 |

(Continued)

OTHER PUBLICATIONS

Alabe, Lawal Wale, et al. "A Deep Learning Approach to Detect Anomalies in an Electric Power Steering System." Sensors, vol. 22, No. 22, 2022, p. 8981, https://doi.org/10.3390/s22228981.

(Continued)

*Primary Examiner* — Redhwan K Mawari
(74) *Attorney, Agent, or Firm* — Dickinson Wright PLLC

(57) ABSTRACT

A method for performing diagnostics on a steering system of a vehicle includes controlling an electronic power steering (EPS) gear of the steering system to apply force to the steering system in accordance with a predetermined torque profile, receiving signals corresponding to a measured response of the steering system caused by the predetermined torque profile, comparing the received signals to an expected response of the steering system, and generating an output that includes a diagnosis of the steering system based on the comparison between the received signals and the expected response of the steering system.

18 Claims, 5 Drawing Sheets

(56) References Cited

U.S. PATENT DOCUMENTS

2023/0349983 A1* 11/2023 Gizinski .............. B62D 5/0481
2023/0391397 A1* 12/2023 Kim ..................... B62D 5/0481

FOREIGN PATENT DOCUMENTS

| CN | 109466621 A | | 3/2019 | |
|----|-------------|---|--------|---|
| CN | 110823603 A | | 2/2020 | |
| CN | 112084698 A | | 12/2020 | |
| CN | 114802425 A | | 7/2022 | |
| CN | 114834524 A | | 8/2022 | |
| JP | 2009126186 A | * | 6/2009 | |
| KR | 20140119194 A | * | 10/2014 | ............ B60W 30/02 |
| KR | 102199103 B1 | | 1/2021 | |

OTHER PUBLICATIONS

Allous, Manel, et al. "Fast Fault-Tolerant Control of Electric Power Steering Systems in the Presence of Actuator Fault." Proceedings of the Institution of Mechanical Engineers, Part D: Journal of Automobile Engineering, vol. 233, No. 12, 2018, pp. 3088-3097, https://doi.org/10.1177/0954407018816556.

* cited by examiner

VEHICLE STEERING SYSTEM DIAGNOSTICS TOOL

TECHNICAL FIELD

This disclosure relates to diagnostic systems and methods for vehicle steering systems.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

SUMMARY OF THE INVENTION

This disclosure relates generally to diagnostic systems and methods for vehicle steering systems.

An aspect of the disclosed embodiments includes a method for performing diagnostics on a steering system of a vehicle. The method includes controlling an electronic power steering (EPS) gear of the steering system to apply force to the steering system in accordance with a predetermined torque profile, receiving signals corresponding to a measured response of the steering system caused by the predetermined torque profile, comparing the received signals to an expected response of the steering system, and generating an output that includes a diagnosis of the steering system based on the comparison between the received signals and the expected response of the steering system.

In other aspects, the output identifies at least one component of the vehicle causing a performance issue related to operation of the steering system. Controlling the EPS gear includes causing the EPS gear to apply the force to alternately rotate wheels of the vehicle between first and second directions. The predetermined torque profile corresponds to a periodic torque control signal. The predetermined torque profile corresponds to a sinusoidal torque control signal. The predetermined torque profile includes at least one of increases and decreases in a frequency of the sinusoidal torque control signal. The predetermined torque profile includes stepwise frequency increases in the sinusoidal torque control signal.

In other aspects, the method further includes supplying the received signals to a machine learning model configured to correlate deviations between the expected response and the measured response to respective components of the vehicle. The received signals include internal signals of the EPS gear. The internal signals of the EPS gear include at least one of a temperature of the EPS gear, an EPS gear ratio, steering wheel torque, motor position, a motor torque command, motor velocity, generated hand wheel torque, and frequency parameters of the control of the EPS gear.

In other aspects, a diagnostic system is configured to perform diagnostics on a steering system of a vehicle. The diagnostic system includes an electronic power steering (EPS) gear configured to apply force to the steering system and test control circuitry configured to control the EPS gear to apply force to the steering system in accordance with a predetermined torque profile, receive signals corresponding to a measured response of the steering system caused by the predetermined torque profile, compare the received signals to an expected response of the steering system, and generate an output that includes a diagnosis of the steering system based on the comparison between the received signals and the expected response of the steering system.

In other aspects, the output identifies at least one component of the vehicle causing a performance issue related to operation of the steering system. Controlling the EPS gear includes causing the EPS gear to apply the force to alternately rotate wheels of the vehicle between first and second directions. The predetermined torque profile corresponds to a periodic torque control signal. The predetermined torque profile includes at least one of increases and decreases in a frequency of the sinusoidal torque control signal. The predetermined torque profile includes stepwise frequency increases in the sinusoidal torque control signal.

In other aspects, the test control circuitry is configured to supply the received signals to a machine learning model configured to correlate deviations between the expected response and the measured response to respective components of the vehicle. The received signals include internal signals of the EPS gear. The internal signals of the EPS gear include at least one of a temperature of the EPS gear, an EPS gear ratio, steering wheel torque, motor position, a motor torque command, motor velocity, generated hand wheel torque, and frequency parameters of the control of the EPS gear. A vehicle includes the diagnostic system.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
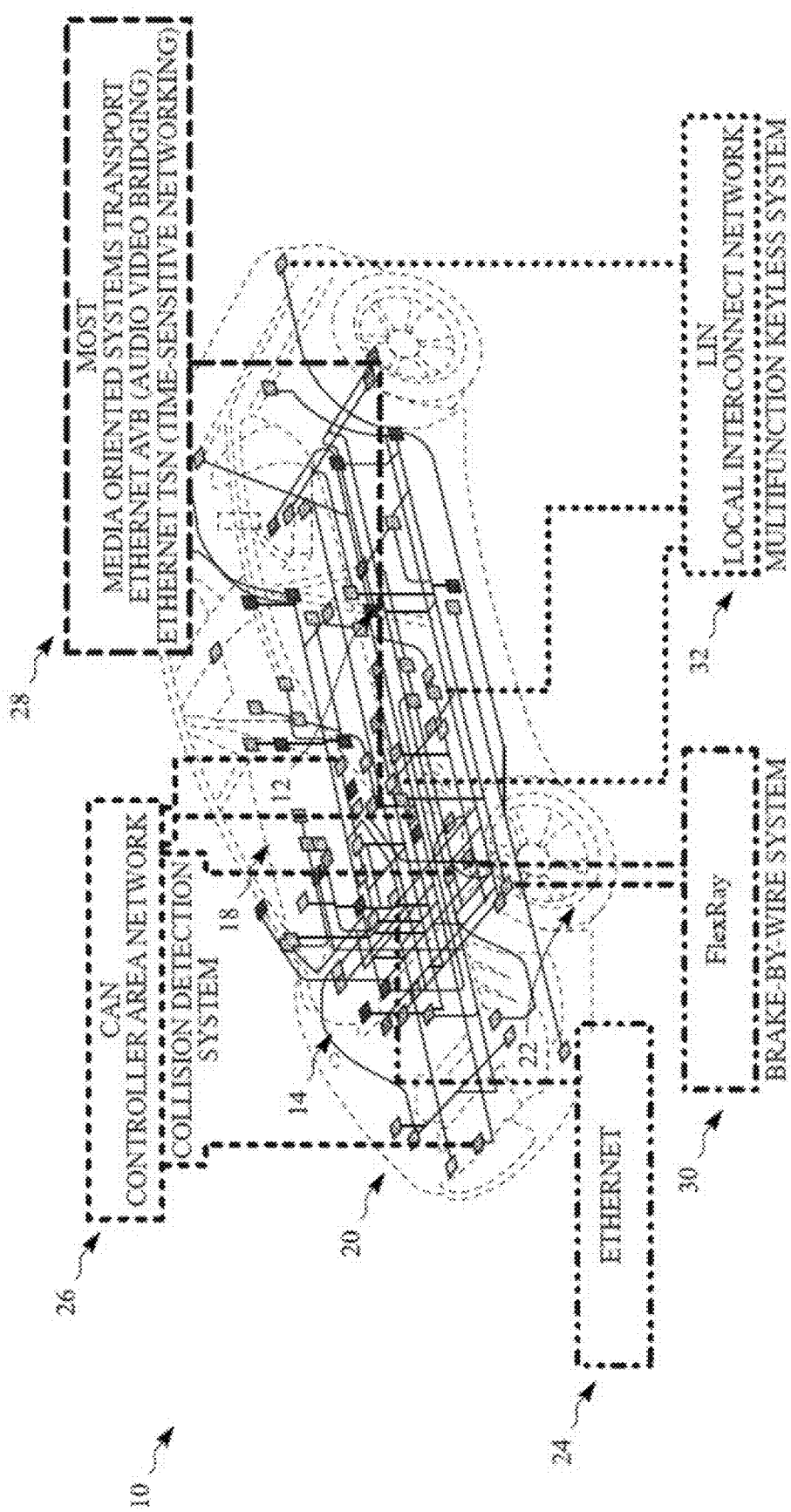
FIG. 1A generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

Such a steering system and/or other components of the vehicle may generate various data, which may be processed by one or more controllers of the vehicle. The data may be associated with any aspect of the vehicle and/or vehicle operation including, but not limited to, data indicating anomalies and/or faults in operations of the vehicle. Increasingly, the controllers of the vehicle may use one or more machine learning or other artificial intelligence networks, such as deep neural networks or other suitable networks, to process the vehicle data.

Typically, when a driver notices issues with the steering system (e.g., steering wheel vibration, reduction in steering performance, loss of steering assist, etc.), a mechanic or technician diagnoses respective causes of the issues. In some examples, trouble codes identifying the issues can be obtained from the vehicle (e.g., via a port providing access to a vehicle communication network, such as a controller area network (CAN) of the vehicle). However, some issues may not be readily identifiable using trouble codes. In these examples, accuracy and timeliness of the diagnosis are dependent upon the ability of the mechanic to analyze symptoms of the issues and identify possible causes, which may include identification of trouble codes, visual and manual inspection, test drives, etc. In other examples, such as in steer-by-wire (SbW) systems, there is no physical connection between the steering wheel and a steer assist mechanism. Accordingly, many of the symptoms that may indicate steering system issues to the driver or mechanic would not be present. In any of the above examples where steering system issues cannot be readily diagnosed, an inaccurate or inconclusive diagnosis may lead to unnecessary replacement of parts, increased costs, etc.

Accordingly, diagnostic systems and methods according to the present disclosure are configured to diagnose steering system issues that may not be readily identifiable using trouble codes or symptoms noticeable to the driver. For example, a diagnostic system is configured to control an electronic power steering (EPS) gear to energize the steering system at a predetermined frequency or range of frequencies. A response of the steering system is captured (e.g., by measuring internal EPS variables and/or using one or more vehicle sensors) and steering-related issues are identified based on the steering system response. As one example, the diagnostic system implements one or more machine learning (ML) models configured to analyze the steering system response and diagnose issues based on the steering system response.

The diagnostic system may be implemented using a controller or other processing device (e.g., a domain controller) located on the vehicle, an external device (e.g., an external computing device, such as a laptop, connected to the vehicle CAN bus via a diagnostic port), a cloud computing system, etc.

In an example, the diagnostic system controls the EPS gear to output a target force or torque profile to the steering system. For example, a torque profile may correspond to a sinusoidal or other periodic torque control signal that increases (or decreases) in frequency at defined time increments (e.g., a frequency sweep control signal). In some example, the diagnostic system may provide force, torque, or position commands to the EPS gear. In other examples, the diagnostic system may provide test parameters to the EPS gear and the EPS gear (e.g., an associated controller or control circuitry) is configured to perform test functions (i.e., control the steering system) based on the test parameters. The diagnostic system is configured to monitor and record/store data indicating the steering system response (e.g., data received from the EPS gear, the CAN bus, etc.) prompted by the operation of the EPS gear.

The stored data may be provided to, for example, one or more steering system diagnostic models (e.g., prediction models, such as ML models). The diagnostic models are configured to generate one or more prediction outputs indicating faults or issues related to the steering system. The diagnostic system combines outputs of the one or more diagnostic models to determine a pass or fail condition for the steering system. In response to a fail condition being determined, the diagnostic system may cause a corresponding diagnosis to be displayed (e.g., to the driver via a vehicle display or indicator, to a user of an external computing device, such as a laptop implementing the diagnostic system, etc.). The diagnosis may identify which components of the steering system are contributors to the fail condition or steering wheel issues and may include a confidence or probability score (i.e., a score indicting a likelihood that each component is causing an issue with the steering system). In some examples, the diagnostic system may recommend and/or perform one or more corrective actions.

FIG. 1A generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on a more rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10. In some examples, the steering system includes an EPS gear configured to provide steering assist functions. As used herein, "EPS gear" may refer to an EPS gear assembly including, for example, a motor, a gear reducer, and a controller or control circuitry). The diagnostic system according to the present disclosure is configured to (i) provide inputs to the EPS gear to cause the EPS gear to output torque to the steering system, (ii) measure a response of the steering system caused by the torque output by the EPS gear, and (iii) diagnose the steering system based on the response.

Figure 1B:
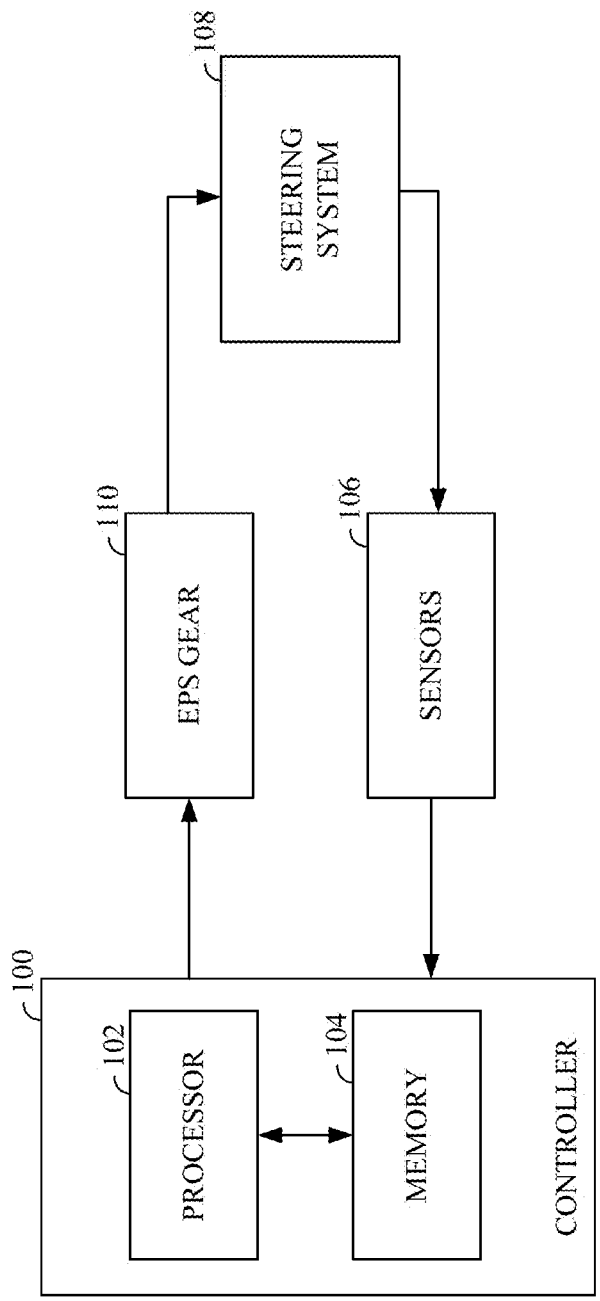
FIG. 1B generally illustrates a controller according to the principles of the present disclosure.

In some embodiments, the vehicle 10 may include a controller, such as a controller 100, as is generally illustrated in FIG. 1B. The controller 100 may include any suitable controller, such as an electronic control unit or other suitable control circuitry. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10. Additionally, or alternatively, the memory 104 may include instructions that, when executed by the processor 102, cause the processor 102 to perform functions associated with the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

In some examples, the controller 100 implements a diagnostic system configured to diagnose a steering system 108 of the vehicle according to the present disclosure. For example, the controller 100 is a domain controller configured to control (e.g., supply inputs to) an EPS gear 110 to cause the EPS gear 110 to output torque to the steering system 108 (e.g., to provide steering assist functions). The controller 100 measures a response of the steering system 108 caused by the torque output by the EPS gear 110 (e.g., based on signals received from the sensors 106 and perform a diagnosis of the steering system 108 as described below in more detail. In other examples, an external device or controller (e.g., an external computing device, such as a laptop, connected to the vehicle CAN bus via a diagnostic port), a cloud computing system, etc. implements the diagnostic system.

Figure 2:
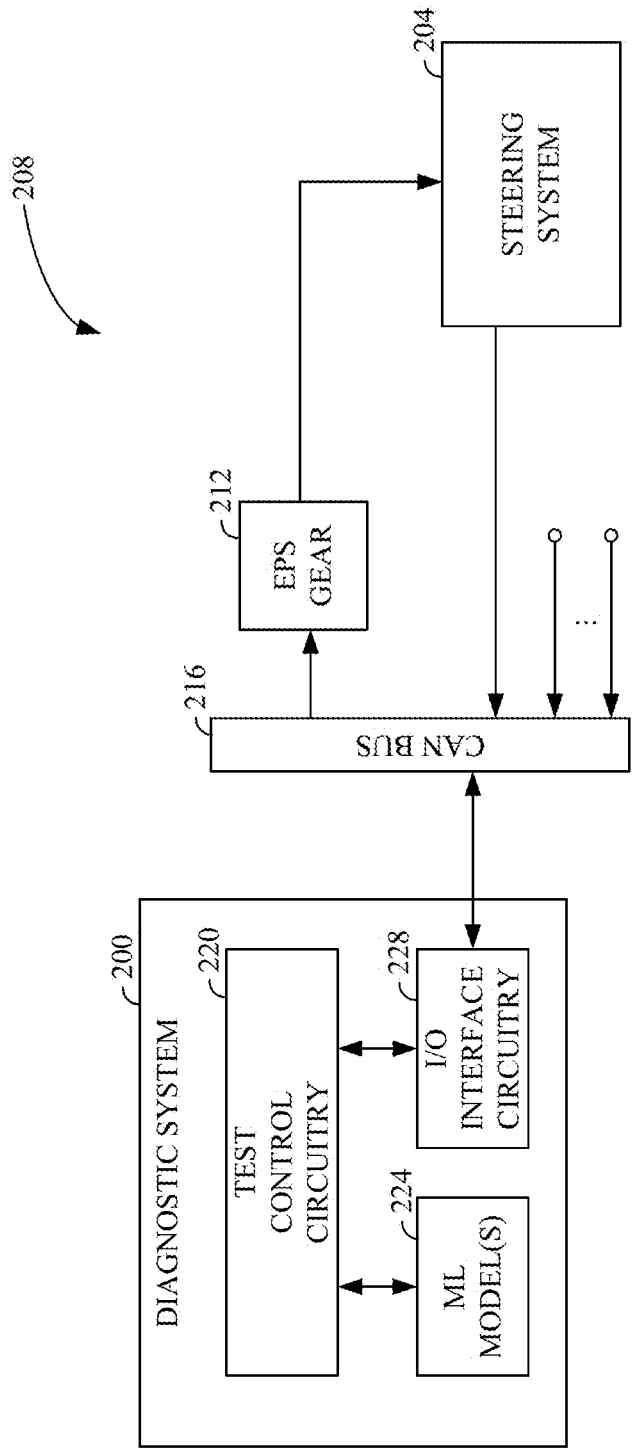
FIG. 2 shows an example diagnostic system according to the principles of the present disclosure

FIG. 2 shows an example diagnostic system 200 according to the present disclosure in more detail. The diagnostic system 200 is configured to diagnose a steering system 204 of a vehicle 208. For example only, the diagnostic system 200 may be implemented using a controller, such as the controller 100 of FIG. 1B. In some examples, the diagnostic system 200 is implemented at least partially using a domain controller of the vehicle 208. In other examples, the diagnostic system is implemented at least partially using a computing device external to the vehicle 208, such as a laptop or diagnostic tool coupled to a diagnostic port (e.g., an on-board diagnostics, or OBD-II, port; not shown) of the vehicle 208. In any of the above examples, the diagnostic system 200 is configured to communicate with the vehicle 208 and vehicle components (e.g., the steering system 204, and EPS gear 212, etc.) using a vehicle network, such as a CAN bus 216.

The diagnostic system 200 includes test control circuitry 220 configured to implement one or more ML models 224. The test control circuitry 220 may be implemented as a test controller, a processor or processing device, etc. configured to execute instructions to cause the diagnostic system 200 to perform diagnostic functions described below. In some example, the test control circuitry 220 may be implemented by one or more processors, such as a single processor configured to implement the functions described herein or multiple processors configured to collectively implement the functions described herein.

For example, the test control circuitry 220 outputs commands to the EPS gear 212 (e.g., to the CAN bus 216 via input/output (I/O) circuitry 228) to cause the EPS gear 212 to supply a steering assist force or torque to the steering system 204. In some examples, the commands output by the test control circuitry 220 may correspond to a commanded force, torque, position, or other commanded value. In other examples, the commands may correspond to test parameters and the EPS gear 212 (e.g., an associated controller or control circuitry) performs test functions (i.e., controls the steering system 204) by operating in accordance with a target output force, torque, position, etc. based on the test parameters. For example, test control functions may be embedded within the EPS gear 212 (e.g., within a controller of an EPS gear assembly) and the EPS gear 212 operates in accordance with a predetermined torque profile in response to a command to perform a diagnosis of the steering system. The commands output by the test control circuitry 220 or otherwise used to control operation of the EPS gear 212 may be referred to as a torque profile.

Figure 3:
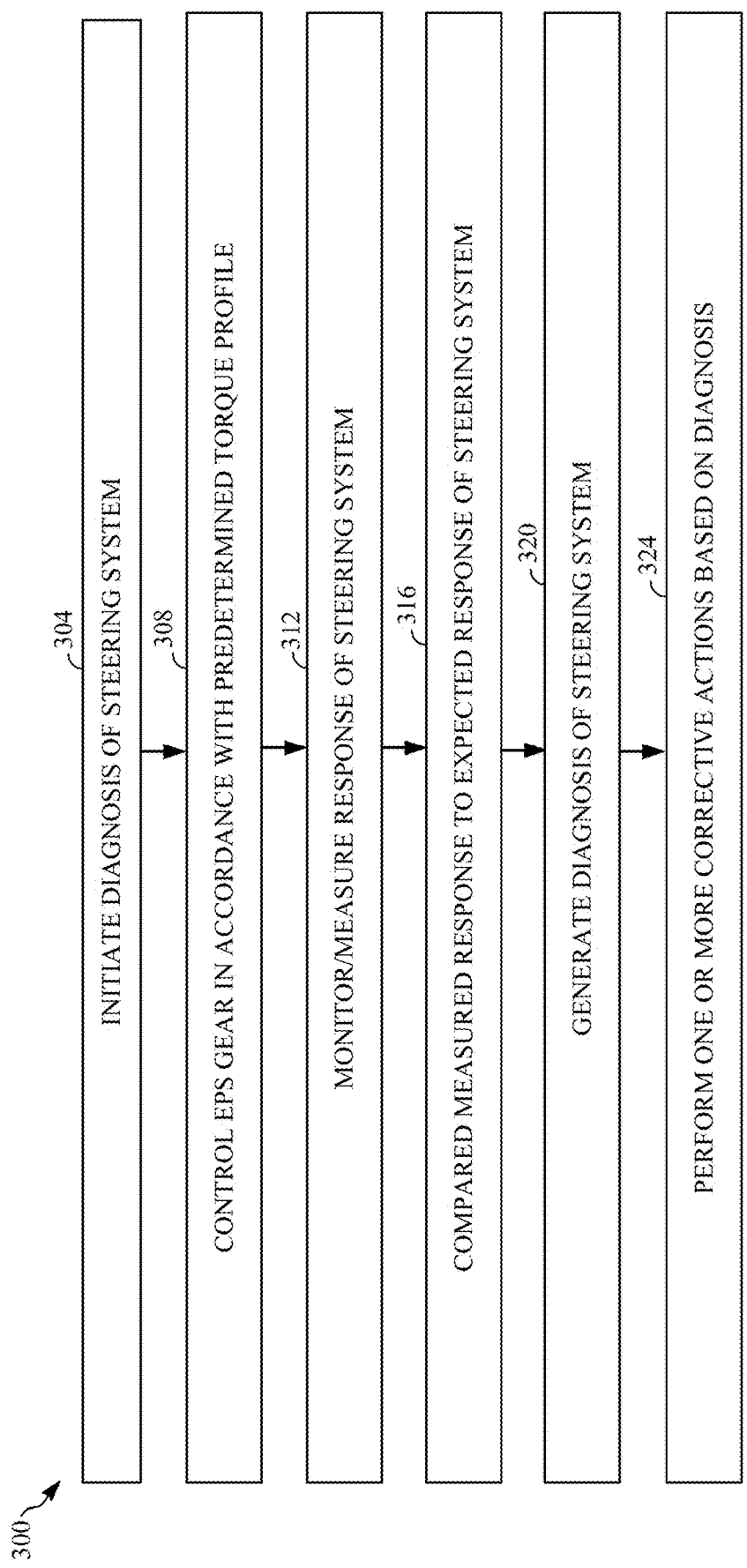
FIG. 3 is a flow diagram generally illustrating a method for diagnosing a steering system of a vehicle according to the principles of the present disclosure.

FIG. 3 is a flow diagram generally illustrating a method for diagnosing a steering system of a vehicle according to the principles of the present disclosure. At 304, the method 300 initiates a diagnosis or diagnostic test of the steering system 204. For example, the diagnostic system 200 outputs a command to the EPS gear 212 to perform the diagnosis. In some examples, the diagnostic system 200 may continue to send commands during the diagnosis to cause the EPS gear 212 to operate in accordance with a torque profile (e.g., perform a frequency sweep). In other examples, the EPS gear 212 is configured to operate in accordance with an embedded diagnosis process or sequence of functions in response to receiving the command to initiate the diagnosis.

At 308, the method 300 (e.g., responsive to the diagnostic system 200, control circuitry of the EPS gear 212, or a combination thereof) controls the EPS gear 212 in accordance with a predetermined torque profile as described above. As one example, the torque profile corresponds to a sinusoidal or other periodic torque control signal configured to cause the wheels of the vehicle to move/rotate back and forth (i.e., from left to right, such as from leftmost to rightmost positions). The torque profile includes frequency changes (i.e., stepped/stepwise increases and/or decreases in the frequency of the torque control signal) that cause the wheels to rotate at a greater or lesser frequency. As one example, the torque control signal may have a first frequency for a first period, a second frequency for a second period subsequent to the first period, a third frequency for a third period subsequent to the second period, etc. In each period, maximum or minimum commanded torque may be the same or different. In other words, the torque profile corresponds to a torque control signal having a sequence of commanded varying frequencies and, in some examples, varying magnitudes.

At 312, the method 300 monitors/measures a response of the steering system 204 while the EPS gear 212 is controlled in accordance with the torque profile. For example, the diagnostic system 200 monitors the CAN bus 216 to receive/obtain data indicative of the response of the steering system 204. Signals and data communicated on the CAN bus 216 that may be indicative of the response of the steering system 204 may include, but are not limited to, battery voltage, EPS temperatures, EPS gear ratio, steering wheel torque, steering wheel position, steering wheel rotational velocity, motor (i.e., of the EPS gear 212) position, motor torque command, motor velocity, generated hand wheel torque, and parameters of the frequency sweep (e.g., sweep frequency, sweep gain, sweep state, sweep gain, sweep mode, sweep offset, sweep amplitude, etc.).

In some examples, initiating the diagnosis causes the EPS gear 212 to output, to the CAN bus 216, internal data or signals that may not typically be output to the CAN bus 216. For example, during normal operation (i.e., while not in a testing or diagnostic mode), the EPS gear 212 may operate in accordance with various internal signals that are not output to the CAN bus 216. These internal signals may include, but are not limited to, internal EPS temperatures, EPS gear ratio, steering wheel torque, motor position, motor torque command, motor velocity, generated hand wheel torque, and parameters of the frequency sweep (e.g., sweep frequency, sweep gain, sweep state, sweep gain, sweep mode, sweep offset, sweep amplitude, etc.)

During diagnosis of the steering system 204 (e.g., while operating in accordance with the predetermined torque profile described above), the EPS gear 212 outputs one or more internal signal to the CAN bus 216 for use by the diagnostic system 200.

At 316, the method 300 (e.g., the diagnostic system 200) compares the measured response of the steering system 204 to an expected response of the steering system 204. For example, the predetermined torque profile may have an associated expected response, such as expected system oscillation, transfer function, etc. Accordingly, the diagnostic system 200 (e.g., the test control circuitry 220, implementing the ML model 224) compares various features of the measured response to the expected response to identify issues with the steering system 204. As one example, the ML model 224 is configured to correlate various deviations from the expected response with respect components of the steering system 204 that may be contributing to the deviations and therefore may be causing performance issues with the steering system 204.

At 320, the method 300 (e.g., the diagnostic system 200, using the ML models 224) generates a diagnosis of the steering system 204 based on the comparison between the measured response and the expected response. For example, the diagnosis may include one or more prediction outputs indicating faults or issues related to the steering system 204, a pass or fail condition for the steering system 204, an identification of one or more components of the steering system 204 causing a fail condition or other issue with the steering system 204, etc.

At 324, the method 300 (e.g., the diagnostic system 200) may perform one or more corrective actions based on the diagnosis. For example, the diagnostic system 200 may cause a corresponding diagnosis to be displayed (e.g., to the driver via a vehicle display or indicator, to a user of an external computing device, such as a laptop implementing the diagnostic system, etc.). The diagnosis may identify which components of the steering system 204 are contributors to the fail condition or steering wheel issues and may include a confidence or probability score (i.e., a score indicting a likelihood that each component is causing an issue with the steering system). In some examples, the diagnostic system 200 may recommend and/or perform one or more corrective actions, such as displaying a recommendation to have the vehicle serviced.

Figure 4C:
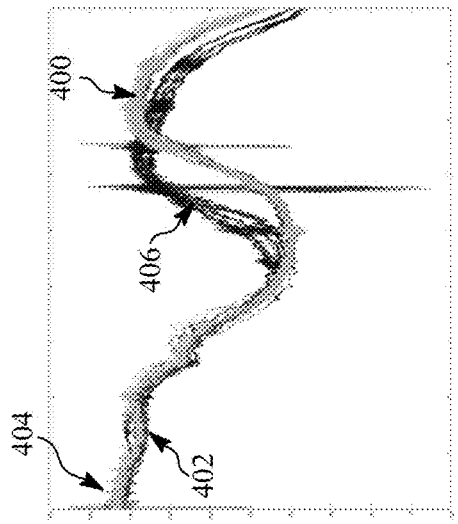
FIGS. 4A, 4B, and 4C illustrate various signals used to diagnose a steering system according to the present disclosure.
Figure 4B:
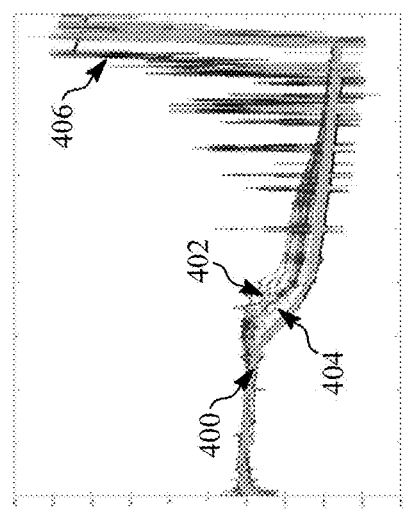
Figure 4A:
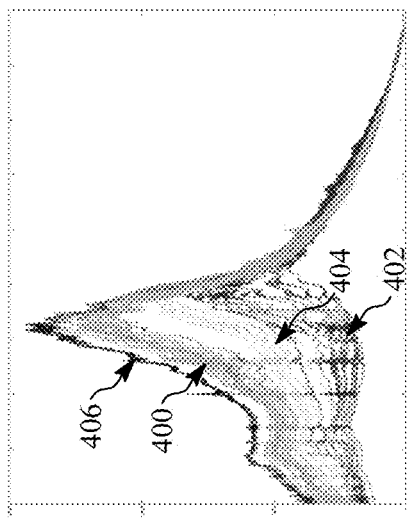

FIGS. 4A, 4B, and 4C illustrate examples of various signals (e.g., transfer functions of various signals) used to diagnose the steering system 204 according to the principles of the present disclosure. In each of these examples, a signal shown at 400 illustrates a baseline (e.g., expected) signal or expected response as described above. The baseline signals 400 correspond to, for example, steering wheel torque, steering wheel position, steering wheel rotational velocity, EPS gear motor position, torque command, or velocity, etc. Conversely, the signals shown at 402, 404, and 406 correspond to the measured response of the steering system 204 and include deviations from the expected response. In each of the examples, the measured response signals 402, 404, 406 may include deviations in amplitude, phase, variations in local maximums or minimums, offsets, etc. Further, deviations may be present in only some of the signals for some components. For example only, deviations shown in the signals 402 may correspond to issues with the EPS gear mount. Conversely, deviations shown in the signals 404 may correspond to issues with a jam nut, and deviations shown in the signals 406 may correspond to issues with a steering column "U" joint.

Accordingly, over time the ML models 224 are trained to correlate deviations in selected signals (i.e., deviations in a signal corresponding to the measured response relative to the expected response) to specific components of the steering system 204.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for performing diagnostics on a steering system of a vehicle, the method comprising:
   initiating, by a diagnostic system, the performing of the diagnostics on the steering system;
   outputting, from test control circuitry, a predetermined torque profile for performing the diagnostics on the steering system;
   controlling an electronic power steering (EPS) gear of the steering system to apply, during the performing of the diagnostics on the steering system, force to the steering system in accordance with the predetermined torque profile, wherein the applied force causes movement of wheels of the vehicle, and wherein the predetermined torque profile corresponds to a periodic torque control signal;
   receiving signals corresponding to a measured response of the steering system caused by the predetermined torque profile for performing the diagnostics on the steering system;
   comparing the received signals to an expected response of the steering system associated with the predetermined torque profile for performing the diagnostics on the steering system; and
   generating an output that includes a diagnosis of the steering system based on the comparison between the received signals and the expected response of the steering system.

2. The method of claim 1, wherein the output identifies at least one component of the vehicle causing a performance issue related to operation of the steering system.

3. The method of claim 1, wherein controlling the EPS gear includes causing the EPS gear to apply the force to alternately rotate the wheels of the vehicle between first and second directions.

4. The method of claim 1, wherein the predetermined torque profile corresponds to a sinusoidal torque control signal.

5. The method of claim 4, wherein the predetermined torque profile includes at least one of increases and decreases in a frequency of the sinusoidal torque control signal.

6. The method of claim 5, wherein the predetermined torque profile includes stepwise frequency increases in the sinusoidal torque control signal.

7. The method of claim 1, further comprising supplying the received signals to a machine learning model configured to correlate (i) deviations between the expected response and the measured response to (ii) respective components of the vehicle.

8. The method of claim 1, wherein the received signals include internal signals of the EPS gear.

9. The method of claim 8, wherein the internal signals of the EPS gear include at least one of a temperature of the EPS gear, an EPS gear ratio, steering wheel torque, motor position, a motor torque command, motor velocity, generated hand wheel torque, and frequency parameters of the control of the EPS gear.

10. A diagnostic system configured to perform diagnostics on a steering system of a vehicle, the diagnostic system comprising:
    an electronic power steering (EPS) gear configured to apply force to the steering system; and
    test control circuitry configured to, to perform the diagnostics on the steering system,
       output a predetermined torque profile for performing the diagnostics on the steering system,
       control the EPS gear to apply, during the performing of the diagnostics on the steering system, force to the steering system in accordance with the predetermined torque profile, wherein the applied force causes movement of wheels of the vehicle, and wherein the predetermined torque profile corresponds to a periodic torque control signal,
       receive signals corresponding to a measured response of the steering system caused by the predetermined torque profile for performing the diagnostics on the steering system,
       compare the received signals to an expected response of the steering system associated with the predetermined torque profile for performing the diagnostics on the steering system, and
       generate an output that includes a diagnosis of the steering system based on the comparison between the received signals and the expected response of the steering system.

11. The diagnostic system of claim 10, wherein the output identifies at least one component of the vehicle causing a performance issue related to operation of the steering system.

12. The diagnostic system of claim 10, wherein controlling the EPS gear includes causing the EPS gear to apply the force to alternately rotate the wheels of the vehicle between first and second directions.

13. The diagnostic system of claim 10, wherein the predetermined torque profile includes at least one of increases and decreases in a frequency of the sinusoidal torque control signal.

14. The diagnostic system of claim 13, wherein the predetermined torque profile includes stepwise frequency increases in the sinusoidal torque control signal.

15. The diagnostic system of claim 10, wherein the test control circuitry is configured to supply the received signals to a machine learning model configured to correlate (i deviations between the expected response and the measured response to (ii) respective components of the vehicle.

16. The diagnostic system of claim 10, wherein the received signals include internal signals of the EPS gear.

17. The diagnostic system of claim 16, wherein the internal signals of the EPS gear include at least one of a temperature of the EPS gear, an EPS gear ratio, steering wheel torque, motor position, a motor torque command, motor velocity, generated hand wheel torque, and frequency parameters of the control of the EPS gear.

18. A vehicle comprising the diagnostic system of claim 10.

* * * * *